United States Patent [19]

DeChant

[11] 4,311,992
[45] Jan. 19, 1982

[54] REUSABLE RELEASABLE FASTENER

[75] Inventor: Donald W. DeChant, North Olmsted, Ohio

[73] Assignee: Eaton Corporation, Cleveland, Ohio

[21] Appl. No.: 53,889

[22] Filed: Jul. 2, 1979

[51] Int. Cl.³ .................... A44B 21/00; G08B 13/24; G08B 21/00
[52] U.S. Cl. ................... 340/572; 24/150 R; 24/155 BR; 24/255 SL; 24/260
[58] Field of Search ....... 340/572; 24/150 R, 155 BR, 24/136 R, 136 A, 255 R, 255 SL, 260, 263 SW, 73 B, 73 SM, 81 B; 403/20

[56] References Cited

U.S. PATENT DOCUMENTS

| | | | |
|---|---|---|---|
| 3,631,442 | 12/1971 | Fearon | 340/572 |
| 3,665,448 | 5/1972 | McGlinchey et al. | 340/539 |
| 3,858,280 | 1/1975 | Martens | 24/150 R |
| 3,911,534 | 10/1975 | Martens et al. | 24/150 R |
| 3,914,829 | 10/1975 | Paskert | 340/572 |
| 3,932,918 | 1/1976 | Paskert | 24/260 |
| 4,000,543 | 1/1977 | Paskert | 24/150 R |
| 4,104,622 | 8/1978 | Van Niel | 340/572 |
| 4,156,302 | 5/1979 | Van Niel | 24/150 R |

Primary Examiner—Victor N. Sakran
Attorney, Agent, or Firm—R. J. McCloskey; H. D. Gordon

[57] ABSTRACT

A reusable, releasable, tamper-resistant fastener (10) for releasable attachment to the free end of shaft (14) is provided. The fastener comprises a hollow body (20) having a lower portion (24) and an upper portion (26) defining a cavity (28) therebetween. The lower portion has an aperture (30) therethrough and the upper portion has an elongated slot (32) therein. The central portion (38) of the slot is aligned with the aperture. A one-piece spring steel clip (22) is nonrotationally received in the cavity and has a nondeformed position for retaining a received shaft and a resiliently deformed position for release of a retained shaft. A specially configured tool (T) is provided for insertion through the slot and then rotation relative thereto for selective resilient deformation of the clip to selectively release retained shafts.

17 Claims, 10 Drawing Figures

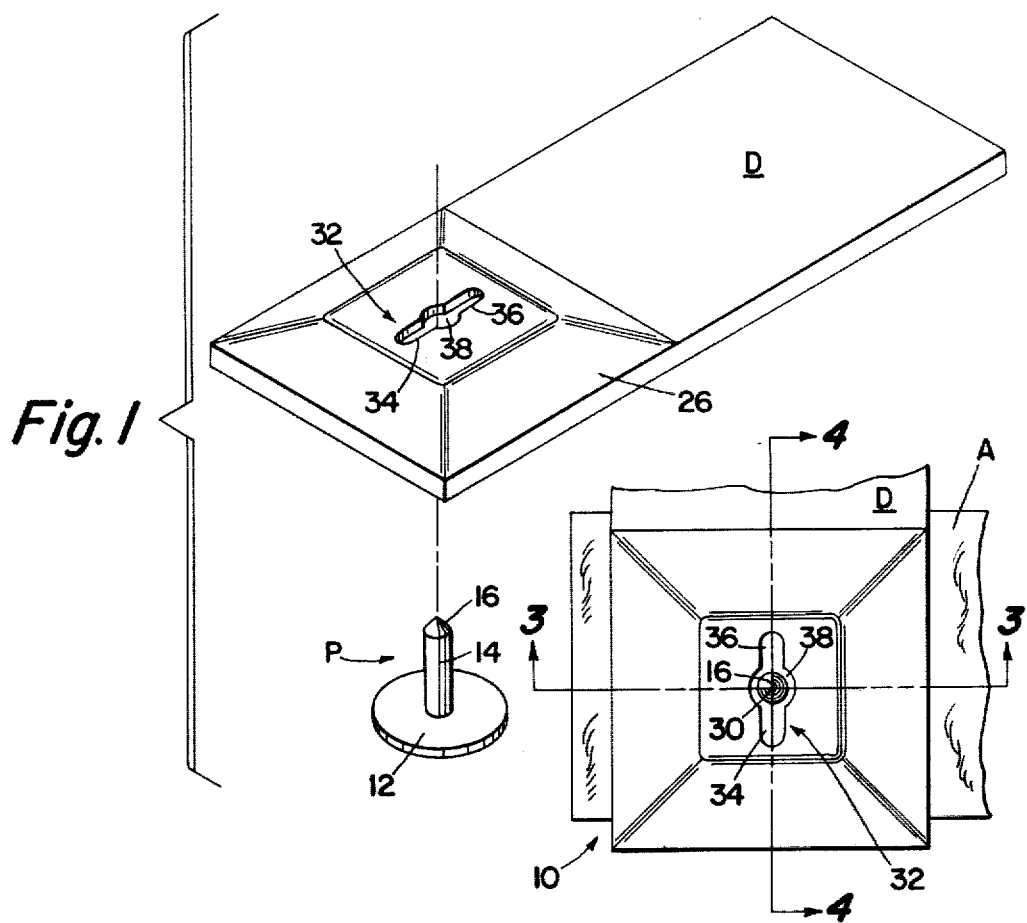
Fig. 1
Fig. 2
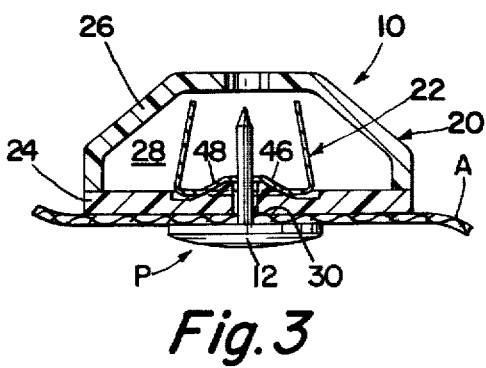
Fig. 3
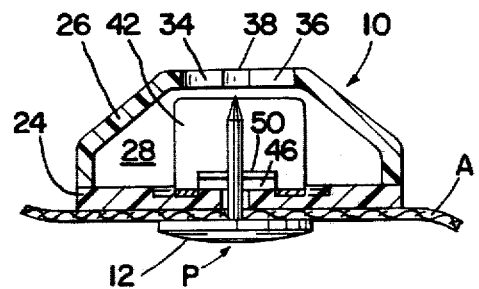
Fig. 4

REUSABLE RELEASABLE FASTENER

BACKGROUND OF THE INVENTION

1. Field of the Invention

This invention relates to reusable, releasable, tamper resistant fasteners which are removably attachable to shafts, such as shafts of pin members, and which are designed to be nondestructably releasable from the pin member only upon the use of a special tool and more particularly relates to reusable, releasable, tamper resistant fasteners for use in connection with monitor actuating devices for removable attachment to the shank of a pin member to attach a monitored article to a monitor actuating device and for nondestructive removal from the pin shank upon the use of a special tool.

2. Description of the Prior Art

Reusable releasable fasteners for selective attachment to the free end of shanks of pin members or the like for use in connection with monitor actuating devices, such as are commonly used in anti-theft systems, to capture a monitored article on the shank of the pin member between the head of the pin and the removable fastener and for resisting nondestructive removal from the pin shank except upon the use of a special tool are well known in the prior art and examples thereof may be seen by reference to U.S. Pat. Nos. 3,911,534; 3,914,829; 3,932,918; 4,000,543 and 4,104,622, all of which are hereby incorporated by reference. In general, these prior art devices were effective to be firmly retained on the shank of a pin and to resist nondestructive removal from the shank of the pin except by use of a specialized tool which might be magnetic, heat and/or mechanical in nature. While the prior art devices have proven effective in many circumstances, certain of the prior art devices were not suitable for all purposes as they were difficult to remove, complicated and/or expensive to manufacture. The use of certain of the prior art devices was not considered satisfactory in certain situations as it was desirable to provide selectively removable fasteners which operated on a different principal and utilized a different type of removal tool than other existing selectively removable fasteners to create a situation making unauthorized removal of the fasteners by amateur shoplifters, who are believed to represent the greatest source of shoplifting losses, more difficult.

SUMMARY OF THE INVENTION

In accordance with the present invention, the drawbacks of the prior art having been overcome to the extent that relatively an inexpensively produced, reusable, selectively releasable, tamper resistant fastener operating on a different principal and utilizing a different type of tool than prior art devices has been provided. The above is accomplished by providing a fastener comprising a generally hollow body in which a one piece spring steel clip is substantially nonrotationally received. The hollow body includes a lower portion having an aperture for receipt of the shaft of the pin and an upper generally dome-shaped portion having an elongated slot therein aligned with the aperture in the lower portion. The one-piece spring steel clip is generally U-shaped in cross section taken on a plane perpendicular to the longest axis of the slot. The one-piece clip includes a base portion and a pair of generally upwardly and inwardly extending leg portions. A pair of cantilevered spring fingers are cut out of the base portion and define a pair of opposed edges for grippingly retaining a received pin shaft. The opposed edges of the spring fingers are spaced apart by a distance less than the diameter of the pin shaft to be received and retained when the clip is in the nondeformed position. The clip is adapted to be resiliently deformed by spreading apart of the leg portions which will cause the opposed edges of the spring fingers to be separated by a distance generally equal to or greater than the diameter of the pin shaft to be received and retained for selective removal of the pin. A tool is provided for use with the fastener which includes a generally rectangular plate shaped head having a length generally equal to the length of the slot and a width generally equal to the width of the slot. The tool head is designed to be received in the slot with the generally flat surfaces thereof parallel to the legs of the clip and to then be rotated relative to the slot so that the tool head will engage the leg portions of the clip and spread same apart for release of the pin shaft. By the use of various slot and tool head configurations, individualized systems of removable fasteners may be provided utilizing common components of fastener bottom portions and clip members.

Accordingly, it is an object of the present invention to provide a new and improved, reusable releasable, tamper resistant fastener.

A further object of the present invention is to provide a new and improved reusable, releasable clip for attachment to the shank of a pin which is designed to resist release from the shank of a received pin except upon the use of a specially configured tool.

Another object of the present invention is to provide an improved monitor actuating device including a reusable, selectively releasable fastener for attachment to the free end of the pin and designed for nondestructive removal from the pin only upon the use of a specially configured tool.

These and other objects and advantages of the present invention may be more fully appreciated by a reading of the following description of the preferred embodiment taken in connection with the attached drawings.

BRIEF DESCRIPTION OF THE DRAWINGS

FIG. 1 is a perspective view of a monitor actuating device including the reusable, selectively removable, tamper resistant fastener of the present invention and a pin member for removable retention in said fastener.

FIG. 2 is a top view of the monitor actuating device of FIG. 1 as removably retaining the pin member of FIG. 1 to removably retain the monitor actuating device to a monitored object.

FIG. 3 is a sectional view of the assembly of FIG. 2 taken along the line 3—3 in FIG. 2.

FIG. 4 is a sectional view of the assembly of FIG. 2 taken along the line 4—4 in FIG. 2.

DESCRIPTION OF THE PREFERRED EMBODIMENT

Figure 5:
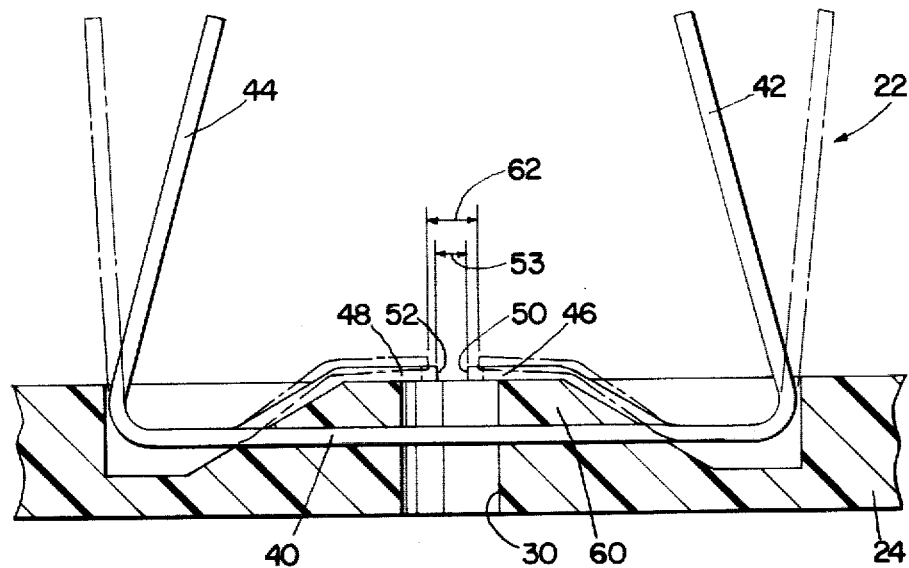
FIG. 5 is an enlarged view, partially in section, showing a portion the lower body portion and clip member of the reusable, removable fastener of the present invention.

Certain terminology will be used in the following description for convenience in reference only and will not be limiting. The words "upwardly" and "downwardly" will designate directions in the drawings. The words "inwardly" and "outwardly" will designate directions toward and away from, respectively, the geometric center of the fastener. Said terminology will include the words above specifically mentioned, derivatives thereof and words of similar import.

A monitor actuating device D incorporating the reusable releasable fastener 10 of the present invention for selective, releasable retention of a pin member P may be seen by reference to FIG. 1. The headed pin P, such as a tack or the like, is utilized to pierce a monitored article A and, in combination with fastener 10, will releasably retain the article to the monitor actuating device D. Preferably, the headed pin P comprises a headed portion 12 and an axially extending shaft 14 of sufficient length to pierce the monitored article and to be retained in fastener 10. The free end 16 of the shank 14 is preferably pointed to facilitate piercing of monitored objects.

The exterior surface of the monitor actuating device D is preferably of a tough and resilient material to prevent vandalism and the device D includes a sensor actuating member or means encapsulated therein. The sensor actuating member may be a magnet, a radio transmitter, a radio antenna or similar device as is well known in the art. It is understood that the actual form of the monitor actuating member forms no part of the present invention. The monitor actuating device D is intended for use in anti-shoplifting systems which are described in some detail in U.S. Pat. Nos. 3,665,448; 3,631,442; 3,557,136 all of which are hereby incorporated by reference.

The use of fastener 10 in combination with pin P to retain a monitored article A to the monitor actuating device D may be seen in greater detail by reference to FIGS. 2, 3 and 4. Briefly, the monitored article A is pierce by the pointed end 16 of the pin shank 14 which is then pushed into the fastener 10 and retained therein to trap the monitored article A between the fastener 10 and the head 12 of pin P.

The fastener 10 comprises a generally hollow body 20 which is preferably formed integrally with the monitor actuating device D and a one-piece spring clip 22 retained within the body 20 for releasably engaging the shank 14 of pin P. Clip 22 may be of spring steel, stainless steel or other suitable tempered metals. The body 20 may be of a molded plastic material and comprises a lower or bottom portion 24 and an upper or dome-shaped portion 26 defining a cavity 28 therebetween in which clip 22 is substantially nonrotationally received. The upper and lower portions of body 20 may be joined by ultrasonic welding or the like.

The lower portion 24 of body 20 includes an aperture 30 therethrough for receipt of the shank 14 of pin P and the dome-shaped portion 26 of the body 20 includes an elongated slot 32. Preferably, slot 32 comprises two elongated portions 34 and 36 of greater length than width joined by a central portion 38 of a generally annular shape having a diameter greater than the width of slot portions 34 and 36. The central portion 38 of the slot 32 in the dome-shaped portion is axially aligned with the aperture 30 in the lower portion of the body.

Figure 9:
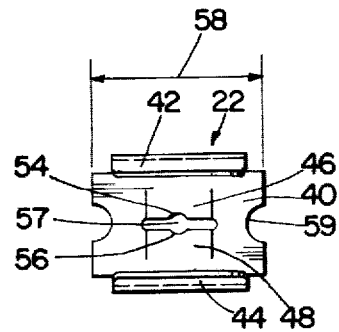
FIG. 9 is a top view of the one-piece spring steel clip of the fastener of the present invention.

The clip 22 of the present invention is a one-piece resiliently deformable sheet metal stamping which may be seen in greater detail by reference to FIGS. 5 and 9. The clip is generally U-shaped in a cross section taken perpendicular to the longitudinal axis of slot 32. The clip 22 comprises a base portion 40 and two leg portions 42 and 44 which extend upwardly and inwardly from the base portion in the nondeformed position of the clip. A pair of oppositely extending generally arcuately shaped cantilevered spring fingers 46 and 48 are cut out from the base portion and define a pair of opposed edges 50 and 52 separated by a distance which is less than the diameter of the shaft 14 of the pin to be removably retained by the fastener 10 in the nondeformed position of clip 22. The opposed edges 50 and 52 include aligned generally concave notches 54 and 56 for receipt and retention of pin shaft 14. The generally annular space 57 between the notches 54 and 56 in the opposed edges 50 and 52 is aligned with aperture 30 and the central portion 38 of slot 32 when the clip is retained within the fastener body. The base portion 40 of clip 22 is of a length 58 which will engage the side wall of the dome-shaped portion 26 of the fastener body to prevent, or limit, rotation of clip 22 relative to the fastener body 20. Alternatively, notches 59 or the like may be provided in the base portion 40 to engage a structure (not shown) of the body to prevent or limit rotation of clip 22 relative to body 20. The bottom portion 24 of fastener body 20 preferably includes a generally convex protrusion 60 surrounding aperture 30 for engagement of the undersides of spring fingers 46 and 48 to prevent downward deflection thereof towards the exterior opening of aperture 30 to prevent or resist removal of a retained pin P from fastener 10 by simply forcing pin P downwardly and outwardly from fastener 10. As may be seen by reference to the dotted line representation in FIG. 5, which is shown in a somewhat exaggerated manner, resilient deflection of leg portions 42 and 44 outwardly will result in the spacing between edges 50 and 52 increasing to a distance 62 which is generally equal to or greater than the diameter of the shaft 14 of pin P allowing the pin to be easily removed from fastener 10 when the clip 22 is deformed to the position represented by the dotted line figure.

Figure 6:
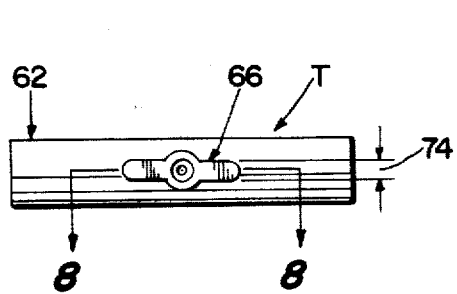
FIG. 6 is a top view of the specially configured tool for use with the fastener of the present invention.
Figure 7:
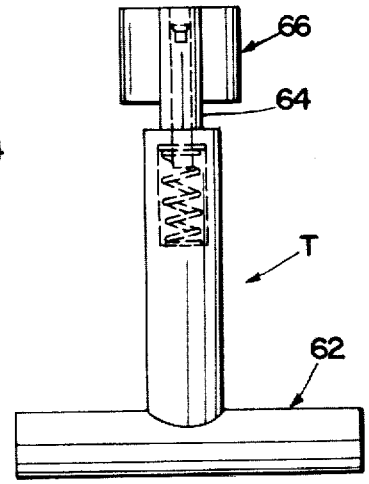
FIG. 7 is a plan view of the specially configured tool of FIG. 6.
Figure 8:
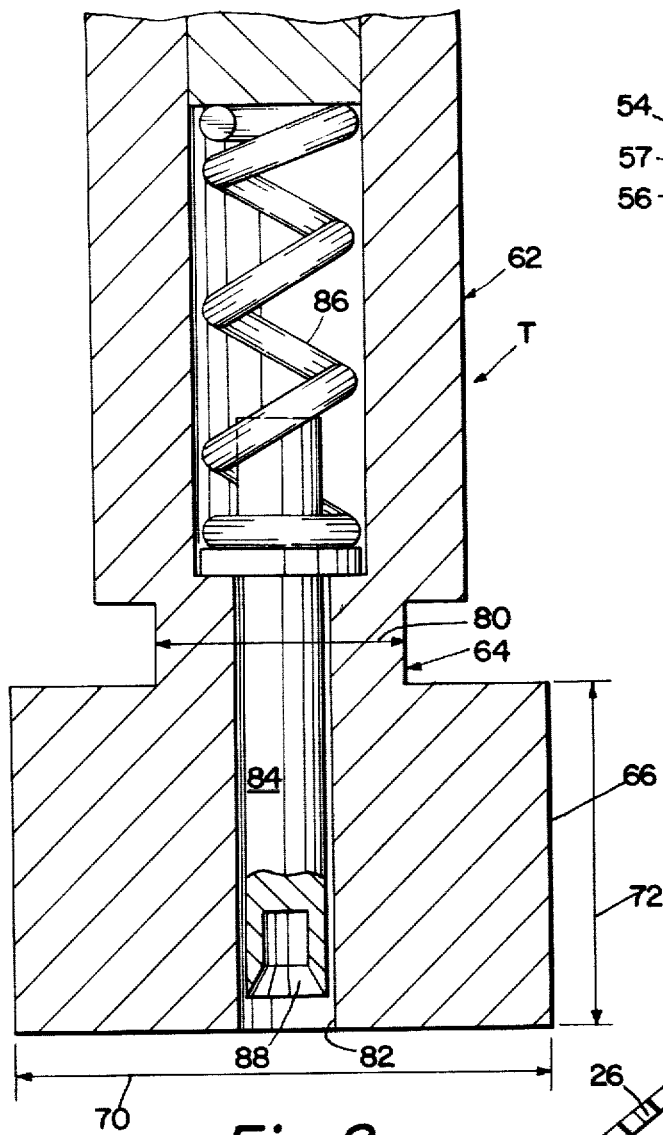
FIG. 8 is enlarged view of a portion of the specially configured tool of FIGS. 6 and 7.

The specially configured tool T for use in connection with fastener 10 for selective release of fastener 10 from a received pin p may be seen by reference to FIGS. 6, 7 and 8. The tool T comprises a handle portion 62, shaft or shank portion 64 extending from the handle and a head portion 66 attached to the end of shank 64 remote from handle 62. The head portion 66 is in the form of a generally flat plate having a length 70, a height 72 and a width 74. The length 70 is slightly less than the length of slot 32 and the width 74 is slight less than the width of slot 32 allowing the head portion 66 to be passed through the slot 32 and into the cavity 28 of fastener body 20. The length 70 of the headed portion 66 is greater than the separation between the leg portions 44 and 42 of the clip 22 in the nondeformed position thereof. When leg portions 42 and 44 are separated by a distance generally equal to length 70, the fastener will assume the position shown in dotted lines in FIG. 5 allowing a retained pin to be easily removed therefrom. The height 72 of head portion 66 is preferably slightly less than the separation of the upper and lower portions of the body 20 of fastener 10. The outer diameter 80 of shank portion 64 of tool T is configured to allow rotation of tool T when the head 66 is fully inserted into the slot. In one embodiment, the head 66 of tool T may include a centrally located bore 82 in which a spring loaded piston 84 is received. Piston 84 is biased downwardly towards the end of the bore and is resiliently movable upwardly by compression of spring 86. Spring loaded piston 84 has an end 88 designed to engage the free end 16 of pin shaft 14 and will be effective to force pin P outwardly from fastener 10 when the pin shaft 14 is disengaged by the spring fingers 46 and 48.

Figure 10:
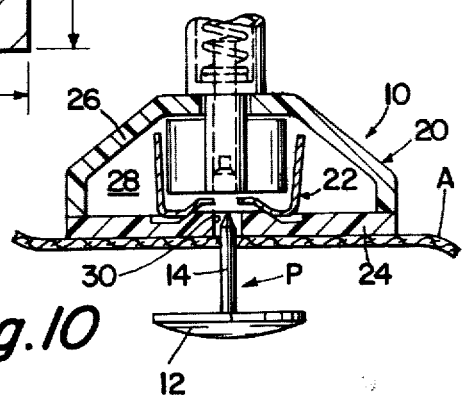
FIG. 10 is a sectional view of the fastener of the present invention as releasing a pin member under the influence of the specially configured tool of the present invention.

In operation, to removably retain a monitored actuating device D to an object A to be monitored, the object A to be monitored is pierced by pin P and then the free end 16 of pin shaft 14 is forced through bore 30 into the fastener 10 whereat the spring fingers 48 and 46 will deflect upwardly to grippingly engage the shaft to entrap the monitored article a between the head 12 of the pin and the fastener body 20. The protrusion 60 will engage the undersides of spring fingers 46 and 48 to resist collapsing thereof upon attempts to axially remove the pin P from fastener 10 without the use of the specially configured tool T. When removal of the pin P from the fastener 10 to disengage the monitor device D from the monitored article A is desired, the specially configured tool T is utilized. The head portion 66 of the tool T is aligned with slot 32 and the head portion is then inserted fully through the slot and into the cavity 28. In this position, the longer edges of the tool head portion 66 will be substantially parallel with leg portions 44 and 42 of clip 22. The free end 16 of pin P will have engaged spring biased piston 84 causing same to move upwardly against the bias of spring 86. The tool T is then rotated approximately 90° (to the position of FIG. 10) causing the edges thereof to engage the leg portions 42 and 44 of spring clip 22 and to resiliently deform same outwardly which will result in a separation of the opposed edges 50 and 52 of spring fingers 46 and 48 sufficient to cause the spring fingers to disengage the shaft 14 of pin P. The pin may then be simply axially removed or will be ejected automatically under the force of the spring biased piston 84. The tool T is then rotated 90° to align same with slot 32 and then simply removed from fastener 10 allowing the fastener 10 to be reused as desired.

Although this invention has been described in its preferred embodiment with a certain degree of particularity, it is understood the present disclosure of the preferred form is made by way of example only and that numerous changes and modifications in the details of construction and arrangement of the parts are possible without departing from the spirit and the scope of the invention has hereinafter claimed.

I claim:

1. A reusable, releasable, tamper-resistant fastener for releasable attachment to the free end of a shaft, said fastener comprising:

a generally hollow body comprising a bottom portion and generally dome-shaped portion defining a cavity therebetween, said bottom portion having a generally centrally located aperture therethrough of greater cross sectional dimension than the cross section of the shaft, said dome-shaped portion having an elongated slot therein opening to said cavity, said slot having a central portion aligned with said aperture; and a one-piece spring clip substantially nonrotationally retained in the cavity of said body, said clip of a generally U-shaped cross section taken on a plane generally perpendicular to the longitudinal axis of said slot and comprising a base portion and two leg portions extending upwardly and inwardly from opposite ends of said base portion, a pair of oppositely extending cantilevered spring fingers cut from one of said base portion and leg portions, the free ends of said spring fingers defining a pair of spaced apart opposed edges separated by a space axially aligned with said aperture, the portions of said edges defining said space separated by a distance less than the cross sectional dimension of said shaft in the nondeformed of said clip, said clip being resiliently deformable by separation of said legs to cause the portions of said edges defining said space to be separated by a distance generally equal to the cross sectional dimension of said shaft.

2. The fastener of claim 1 wherein said spring fingers are cut from said base portion.

3. The fastener of claim 2 wherein separation of said legs by a distance less than the length of said slot is sufficient to cause the portions of said edges defining said space to be separated by a distance at least as great as the cross sectional dimension of said shaft.

4. The fastener of claim 3 wherein said opposed edges each have generally concave notches therein defining a generally annular space therebetween, said generally annular space aligned with said aperture.

5. The fastener of claim 4 wherein said spring fingers are generally arcuate in cross section and said bottom portion of said body includes a generally dome-shaped protrusion surrounding said aperture and extending upwardly from said bottom portion for engagement with the undersides of said spring fingers to limit deflection thereof toward said aperture.

6. The fastener of claim 5 wherein said body portion is formed integrally with a monitor actuating device.

7. A reusable, releasable, tamper-resistant fastener for attachment to the free end of a shaft, said fastener designed for selective removal from a retained shaft upon the use of a specially configured tool comprising a handle, a stem and a tool head attached to said stem, said tool head being in the shape of a generally rectangular plate having a given thickness, length and height, said fastener comprising:

a generally hollow body comprising a bottom portion and a generally dome-shaped portion defining a hollow cavity therebetween, said bottom portion having a generally centrally located aperture therethrough of greater cross sectional dimension than the cross sectional dimension of the shaft to be retained, said dome-shaped portion having an elongated slot therein, said slot having a length and width slightly greater than the length and thickness, respectively, of said tool head, said slot having a central portion aligned with said aperture, said central portion of greater cross sectional dimension than the cross sectional dimension of said stem; and a one-piece spring clip substantially nonrotationally retained in said cavity of said body, said clip of a generally U-shaped cross section taken on a plane generally perpendicular to the longitudinal axis of said slot and comprising a base portion and two leg portions extending upwardly and inwardly from opposite ends of said base portion, said base portion spaced from said dome-shaped portion by a distance greater than the height of said tool head, a pair of cantilevered oppositely extending spring fingers cut from one of said base portion or leg portions and defining a pair of spaced apart opposed edges separated by a space aligned with said aperture, the portions of said edges defining said space separated by a distance less than the cross sectional dimension of said shaft in the nondeformed position of said clip, said clip being resiliently deformable by separation of said leg portions by a distance generally equal to the length of said head portion to cause said portions of said opposed edges defining said space to be separated by a distance greater than the cross sectional dimension of said shaft.

8. The fastener of claim 7 wherein said spring fingers are cut from said base portion.

9. The fastener of claim 8 wherein said opposed edges each have a generally concave notch formed therein to define a generally annular space therebetween, said generally annular space aligned with said aperture.

10. The fastener of claim 8 wherein said spring fingers are generally arcuate in cross section and said bottom portion includes a generally dome-shaped protrusion surrounding said aperture and extending into said cavity for engagement with the undersides of said spring fingers to limit movement of said spring fingers toward said bottom portion.

11. The fastener of claim 8 wherein said body is formed integrally with a monitor actuating device.

12. A monitor actuating device attachment system comprising:
   a pin member having a headed portion and a shaft, the free end of the shaft portion being pointed for piercing a monitored article:
   a monitor actuating device comprising an encapsulated monitor actuating means;
   a releasable, reusable, tamper-resistant fastener for releasable attachment to the free end of said pin member shaft, said fastener formed integrally with said monitor actuating device, said fastener comprising;
   a generally hollow body formed integrally with said monitor actuating device and comprising a bottom portion and a generally dome-shaped portion, said bottom portion having a generally centrally located aperture therethrough of greater cross sectional dimension than the cross sectional dimension of said shaft, said dome-shaped portion having an elongated slot therein, said slot having a central portion aligned with said aperture; and
   a one-piece spring clip substantially nonrotationally retained in said body, said clip of a generally U-shaped cross section taken on a plane generally perpendicular to the longitudinal axis of said slot and defined by a base portion and two leg portions extending upwardly and inwardly from opposite ends of said base portion, a pair of oppositely extending cantilevered spring fingers cut from said base portion and defining a pair of spaced apart opposed edges separated by a space aligned with said aperture, the portions of said edges defining said space separated by a distance less than the cross sectional dimension of said shaft in the nondeformed position of said clip, said clip being resiliently deformable by separation of said legs to cause said portions of said edges defining said space to be separated by a distance greater than the cross sectional dimension of said shaft; and
   a specialized tool designed to release said shaft from said fastener, said tool comprising a handle portion, a shank portion and a tool head portion, said shank portion of lesser cross sectional dimension than said central portion of said slot, said tool head portion being in the shape of a generally rectangular plate having a thickness slightly less than the width of said slot, a length slightly less than the length of said slot, and a height less than the distance between said dome-shaped portion and said base portion, separation of said leg portions by a distance generally equal to the length of said tool head portion being sufficient to cause said portions of edges defining said space to be separated by a distance greater than the cross sectional dimension of said shaft.

13. The system of claim 12 wherein said opposed edges are each provided with aligned concave notches therein to define a generally annular space therebetween, said annular space generally aligned with said aperture.

14. The system of claim 12 wherein said spring fingers are of generally arcuate cross section and said bottom portion is provided with a generally dome-shaped upwardly extending protuberance surrounding said aperture for engagement with the underside of said spring fingers to limit the movement of said spring fingers toward said base portion.

15. The system of claim 12 wherein said tool comprises means to urge retained pin shafts from said fastener upon separation of said edges by a distance greater than the cross sectional dimension of said shaft.

16. The system of claim 15 wherein said means comprises a spring biased piston slidably received in an axially extending bore in said tool head, said piston aligning with said aperture when said tool head is inserted through said slot.

17. The system of claim 12 wherein said tool is effective to cause release of said fastener from a retained pin shaft by insertion of said tool head through said slot into said cavity and then rotation of said tool head relative to said fastener to cause said head to engage said leg portions and to separate same.

* * * * *